(12) United States Patent
Valero

(10) Patent No.: US 6,868,341 B2
(45) Date of Patent: Mar. 15, 2005

(54) METHODS AND APPARATUS FOR PROCESSING ACOUSTIC WAVEFORMS RECEIVED IN A BOREHOLE

(75) Inventor: Henri-Pierre Valero, Tokyo (JP)

(73) Assignee: Schlumberger Technology Corporation, Sugar Land, TX (US)

(*) Notice: Subject to any disclaimer, the term of this patent is extended or adjusted under 35 U.S.C. 154(b) by 26 days.

(21) Appl. No.: 10/328,311

(22) Filed: Dec. 23, 2002

(65) Prior Publication Data

US 2004/0122595 A1 Jun. 24, 2004

(51) Int. Cl.[7] .................................................. G01V 1/28
(52) U.S. Cl. .......................................... 702/11; 702/17
(58) Field of Search ............................ 702/6, 7, 9, 11, 702/12, 13, 14, 17

(56) References Cited

U.S. PATENT DOCUMENTS

| | | | |
|---|---|---|---|
| 4,594,691 A | | 6/1986 | Kimball et al. |
| 5,278,805 A | * | 1/1994 | Kimball ........................ 367/32 |
| 5,594,706 A | * | 1/1997 | Shenoy et al. ................. 367/76 |
| 5,740,124 A | | 4/1998 | Tang et al. |
| 6,449,560 B1 | | 9/2002 | Kimball |
| 2002/0007247 A1 | * | 1/2002 | Cheng et al. .................. 702/17 |

FOREIGN PATENT DOCUMENTS

WO        WO 00/03269        1/2000

OTHER PUBLICATIONS

Cheng, C.H. and Toksoz M.N., "Elastic wave propagation in a fluid filled borehole and synthetic acoustic logs", Geophysics, vol. 46, No. 7, pp. 1042–1053, 1981.

Hsu. K., "Wave separation and feature extraction of acoustic well–logging waveforms using Karhunen–Loeve transformation", Geophysics, vol. 55, No. 2, pp. 176–184, 1990.

Kimball, C.V., Marzetta, T.L., "Semblance processing of borehole acoustic array data", Geophysics, vol. 49, No. 3, pp. 274–281, 1984.

Tubman, K.H., Cheng, C.H., Cole, S.P., and Toksoz, M.H., "Synthetic full waveform acoustic logs in cased hole, Poorly bonded casing", Geophysics, vol. 51, No. 4, pp. 902–913, 1986.

Tubman, K.H., Cheng, C.H. and Koksoz, M.N., "Synthetic full waveform acoustic logs in cased hole", Geophysics, No. 49, No. 7, pp. 1051–1059, 1984.

* cited by examiner

Primary Examiner—Donald McElheny, Jr.
(74) Attorney, Agent, or Firm—William L. Wang; Brigitte Jeffery; John Ryberg

(57) ABSTRACT

A method and apparatus for determining isolating and/or removing a signal of interest from acoustic data. The method and apparatus may be used to measure formation slowness in a cased borehole, in which case the signal of interest may be a casing arrival signal. The casing arrival signal may be detected, rebuilt and removed from a set of acoustic data. Semblance processing is applied to the acoustic data with the casing signal removed, yielding a coherent formation slowness log. A filter band may be defined and automatically administered to detect and remove the signal of interest such as the casing signal.

53 Claims, 6 Drawing Sheets

METHODS AND APPARATUS FOR PROCESSING ACOUSTIC WAVEFORMS RECEIVED IN A BOREHOLE

FIELD OF THE INVENTION

The present invention relates generally to methods and apparatus for detecting, removing and/or isolating signals from acoustic waveform data.

BACKGROUND OF THE INVENTION

Acoustic tools are useful in providing a large range of information regarding formation and borehole parameters adjacent the tools. A primary use of acoustic borehole measurements is the estimation of compressional and/or shear wave formation slowness. The understanding of a recorded waveform in a borehole is quite simple. However, usually the effect of reflected waves from surface boundaries and noise corrupt the recorded data and require an interpretation process. Nevertheless, there have been various methods for interpreting acoustic data, with varying degrees of success in an open hole environment.

In a cased hole environment, however, the complexity of recorded waveforms is much more difficult to interpret. Yet in many difficult well conditions, casings are required. Recent advances in geophysics call for velocities (or slowness measurements) all the way to the surface of a well bore, while in many instances shallow formations can only be logged after casing is set. Thus a method to measure slowness in cased boreholes is desired.

Obtaining compressional and/or shear slowness measurements through a casing is challenging because the effect of the casing depends on the different bonding conditions of the casing to the formation and can therefore mask the formation slowness. Typically the casing signal corrupts the recorded waveforms and induces difficulties in the processing of data to obtain useful slowness measurements. Adding to the difficulty is the challenge of predicting the form and duration of the casing signal as the casing signal is dependant both on the formation slowness and the bonding conditions. The casing may induce a poor coherence for the slowness measurement log, and sometimes results in the loss of the entire formation signal.

The present invention is directed to overcoming, or at least reducing the effects of, one or more of the problems outlined above.

SUMMARY OF THE INVENTION

The present invention meets the above-described needs and others. Specifically, the present invention provides a method of isolating and/or removing a signal of interest including generating acoustic waves with a tool having at least one transmitter and at least one receiver, automatically filtering the signal of interest from acoustic data received by the at least one receiver, and semblance processing the automatically filtered acoustic data. The automatically filtering may further include computing a first semblance including the signal of interest, and projecting the acoustic waveform data into a time domain. The semblance may be projected onto a time axis. The automatically filtering may further include defining a window containing the signal of interest. Defining the window may include defining an optimal filtering frequency band to remove other signal of interest modes. The signal of interest may be a casing signal in a borehole.

Another aspect provides a method of removing one or more signals of interest from acoustic data including projecting the acoustic data onto a time axis, detecting a time position of the one or more signals of interest, and filtering the one or more signals of interest from the acoustic data. The filtering may further include windowing the one or more signals of interest and automatically determining how many components are present in a window using statistical criterion.

Another aspect provides a method of removing a casing signal from sonic data including projecting a time-slowness map of raw data onto a time axis for a slowness value corresponding to a known slowness value of a casing, detecting a time position of the casing, and filtering the time position of the casing from the sonic data. The filtering may include windowing the casing signals and determining how many components are present in a window. In addition, the method may include defining a number of eigenvalues related to the casing signals and rebuilding the casing signals. The rebuilt casing signals may then be removed from the raw data, and a semblance processing may be applied to the raw data with the casing signals removed to evaluate the compressional and shear slowness of a formation behind the casing.

Another aspect provides a method of determining formation slowness in a cased borehole including receiving acoustic waveform data from a transmitter, computing a first semblance based on the sonic waveform data projected onto a time domain, and filtering a signal of interest from the acoustic waveform data using automatic eigenvalues analysis and selection. In some aspects the signal of interest is a casing arrival signal. The method may also include computing a second semblance on filtered data to obtain compressional and shear slowness of a formation through a casing. The computing of the first semblance further include defining at each level an arrival time of the casing signal. The filtering may also include defining a window to extract the signal of interest based on a result of the first semblance computation projected onto a time domain and applying the window to the acoustic or sonic waveform data. With a defined window, the filtering may also include defining a number of signals present in the window and defining a number of eigenvalues and eigenvectors related to the casing signal. The eigenvectors may be obtained by computation of a covariance matrix. The filtering method may also include rebuilding the signal of interest and subtracting it from the sonic waveform data. Accordingly, the filtering may further include defining a filter band to automatically remove all other possible remaining signal of interest modes from the acoustic waveform data. Defining the filter band may include comparing possible modes of the signal of interest to a signal spectrum from the transmitter, and if there is no interference between the modes of the signal of interest and the signal spectrum from the transmitter, then applying a standard frequency filter; but if there is interference between the modes of the signal of interest and the signal spectrum from the transmitter, then defining and applying a filter band to automatically remove all other possible remaining signal of interest modes from the acoustic waveform data. Defining a filter band may also include building and/or using a look-up table of different possible modes of the signal of interest, for example a look-up table for different sized casings.

Another aspect provides a method of determining formation slowness in a cased borehole including generating acoustic waves with a transmitter, receiving the acoustic waves using at least one receiver and generating acoustic raw data, computing semblance of an arrival of interest signal in the slowness-time domain, projecting semblance onto a time axis, defining a window size to extract arrival of interest signal, applying the window to the raw data to define a windowed data set, defining a number of sources in the windowed data, defining a number of eigenvalues and eigenvectors related to the arrival of interest signal, rebuilding the arrival of interest signal, subtracting the rebuilt arrival of interest signal from the raw data to create a processed data set, defining a frequency filter band, and semblance processing the processed data set using the frequency filter band.

Another aspect provides an apparatus for determining formation slowness in a cased wellbore including at least one acoustic transmitter, at least one acoustic receiver, a processor coupled to the acoustic source, the acoustic receiver, or both, and programmed to automatically filter an arrival signal of interest from acoustic data received by the at least one acoustic receiver and apply semblance processing to automatically filtered acoustic data. The processor may also be programmed to compute a semblance of the arrival signal of interest in the time-slowness domain, project the first semblance onto a time axis, define a window size to extract the arrival signal of interest, apply the window to the acoustic data to define a windowed data set, define a number of sources in the windowed data, define a number of eigenvalues and eigenvectors related to a component of interest, rebuild the arrival signal of interest, subtract the rebuilt arrival signal of interest from the acoustic data to create a processed data set, define a sonic signal frequency filter band, and apply semblance processing to the processed data set using the frequency filter band.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers.

DETAILED DESCRIPTION OF THE PREFERRED EMBODIMENTS

Figure 1:
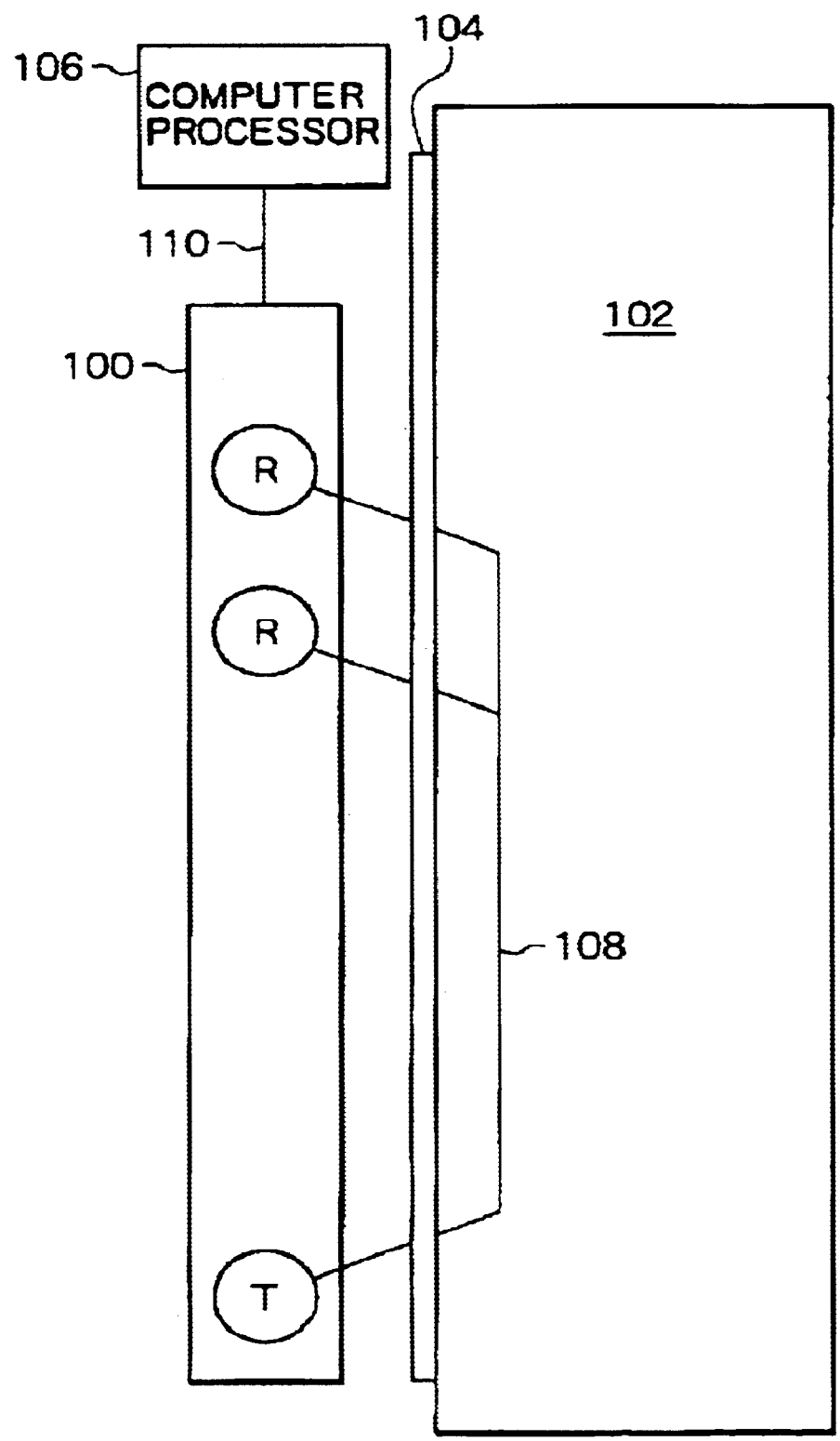
FIG. 1 a representative view of a sonic tool in a cased borehole and coupled to a computer processor according to one embodiment of the present invention.

Turning now to the figures, and in particular to FIG. 1, an acoustic tool (100) is shown adjacent to a homogeneous formation (102). The homogeneous formation (102) is cased with a casing (104). The acoustic tool (100) includes at least one transmitter (T), and at least one receiver (R). In the present embodiment there are two receivers (R) and one transmitter T), however, many more receivers (R) and transmitters (T) may also be used. The one transmitter (T), two receiver (R) arrangement shown is exemplary in nature and there may be a full array of receivers and/or transmitters, or a single transmitter (T) and receiver (R). The receivers (R) and transmitter (T) are coupled to a computer processor (106) for collecting and processing data from the acoustic tool (100). Also shown is a wave ray path (108) representing a path for a compressional wave caused by activation of the transmitter (T). The receivers (R) may be of different types, including, but not limited to, piezoelectric and magnostrictive receivers. The receivers (R) are able to detect the arrival of sonic waves.

Information or data collected from the acoustic tool (100), which may include waveforms generated by the receivers (R) over time, is sent to the computer processor (106) via a cable (110) from which the acoustic tool (100) is suspended. Data may also be sent between the computer processor (106) and the receivers (R) by any other convenient communication technique. The computer processor (106) is commercially available from a wide variety of sources. The acoustic data taken by the acoustic tool (100) and received by the computer processor (106) may be processed implementing an automatic signal-removal approach (described below). The computer processor (106) may be programmed to automatically detect, isolate, and/or remove a signal of interest according to methods of the invention described below. For example, the computer processor (106) may be programmed to automatically remove a casing signal from acoustic or sonic data to determine formation slowness of the formation (102) behind the casing (104) according to methods of the present invention.

One signal that may be of interest is a casing signal in a cased borehole. As mentioned in the background, often the casing arrival (signal related to the casing) corrupts the recorded waveforms inducing difficulties to data processing designed to obtain compressional and shear slowness of the formation (102). Therefore, the present invention includes a methodology for processing acoustic or sonic waveforms through the casing (104). However, the methodology of the present invention is not limited to detection and removal of a casing signal. The methods of the present invention provide for isolating and/or removing any signal of interest from an acoustic data set. Therefore, although the description below references a casing signal and the methodology is described with reference to the casing signal, the method is not so limited and is equally applicable to other signals of interest.

According to principles of the present invention, the processing methodology may be applied for obtaining slowness measurements in a cased wellbore and includes removing a casing arrival signal from raw acoustic or sonic data received by the receivers (R). The raw data may be monopole sonic waveform data according to some embodiments, however, the processing technique of the the present invention may be applied to any kind of acoustic data and is not limited to monopole data. While the methodology is discussed herein according to an exemplary application (calculating formation slowness from sonic data in a cased borehole), it is not limited to the frequency content of the data or the type of data (seismic, ultrasonic etc.). The application of the methods of the present invention provides a way to detect any signal of interest and remove it from the data set.

Preliminary processing of the acoustic data according to one aspect of the invention is designed to detect and/or remove or extract a signal of interest (such as a main casing arrival signal in a cased bore hole) from the acoustic data. For example, the preliminary processing in a cased bore hole may include defining first, at each level of the formation (102), the arrival time of the casing signal. According to other implementations of the present invention, the arrival of any signal of interest may be defined. It will be appreciated by those of skill in the art having the benefit of this disclosure that it is a relatively simple task to predict when a signal such a casing signal will arrive, because usually the mechanical properties of the casing (or other medium) are known or can be easily determined. The difficulty with removing or identifying a signal of interest is determining when the signal will finish. Therefore, according to principles of the present invention, a window is defined to detect the beginning and the end of the signal of interest (which is a casing signal according to one aspect of the invention). However, applying a window may require human monitoring and intervention, which is not desirable for acoustic logging. Normally, acoustic logging is conducted in real time. Therefore, according to one aspect of the present invention, a pre-processing technique is implemented to facilitate automatic detection of the signal of interest in the acoustic data. The automatic detection of signals of interest according to the present invention advantageously allows signal processing without human intervention. One pre-processing technique according to the present invention is discussed below.

Semblance processing is well known to those of skill in the art having the benefit of this disclosure. Semblance processing facilitates the determination of slowness for various components propagating across an array of sonic waveforms. The result of semblance processing is normally represented in a two-dimensional time-slowness map (time vs. slowness). The result of semblance processing is normally presented versus depth by projecting the time-slowness map onto the slowness axis according to the following equation:

$$P_i(s) = \max_t \rho_i(S, t) \quad (1)$$

where $\rho_i$ is the slowness projection, and
$\rho_i$ is the semblance computed at each level, which is a function of the slowness, S, and time, t.

The representation of results above is presented according to standard notation as used in commercial processing.

However, although the result of semblance processing is normally projected onto the slowness axis, according to one aspect of the present invention the time-slowness map is instead projected onto the time axis according to the following:

$$T_i(t) = \max_S \rho_i(S, t) \quad (2)$$

where $T_i$ is the projection on to the time axis.

Figure 2:
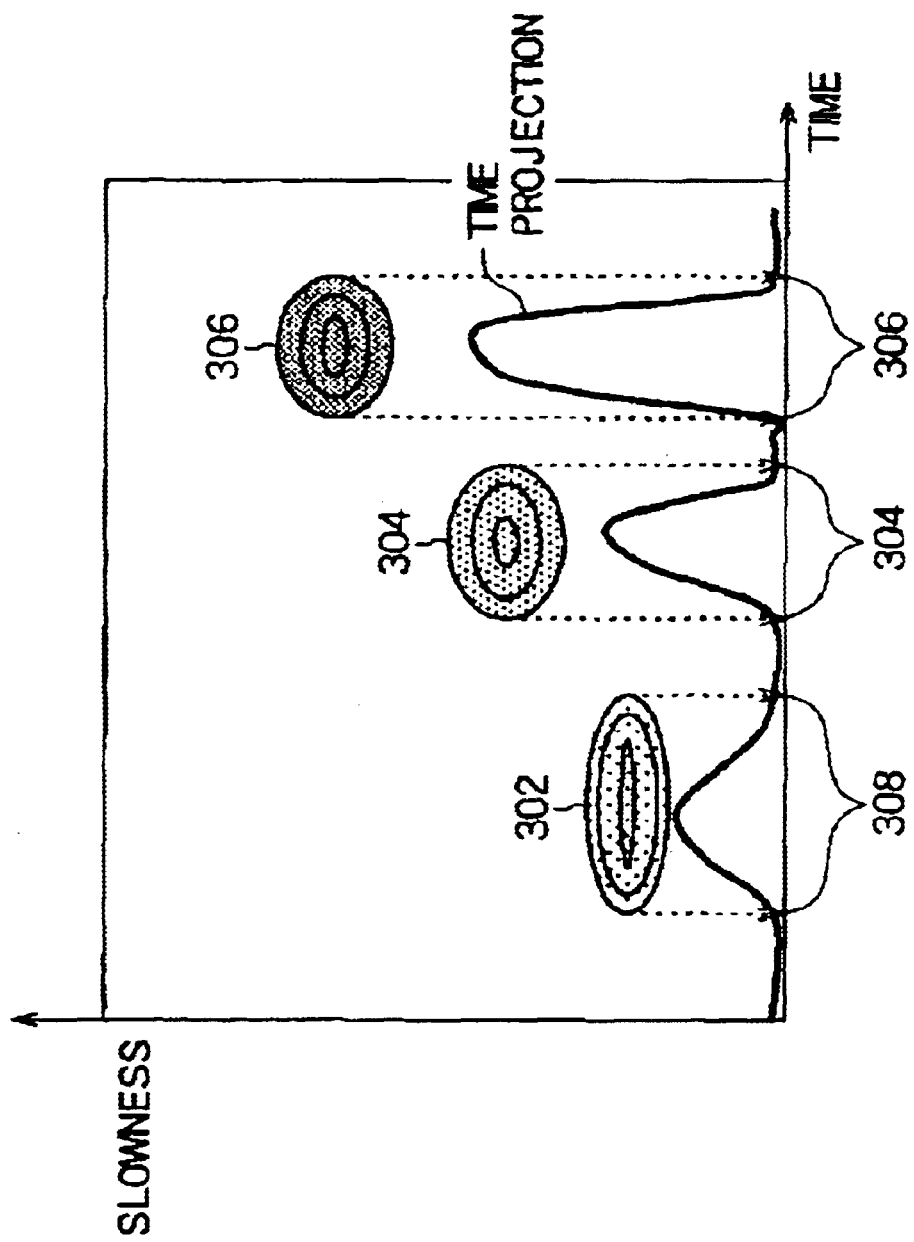
FIG. 2 is a projection of a time-slowness plot onto a time axis according to one aspect of the present invention.

FIG. 2 illustrates the principle of this advantageous time-axis projection technique. The different waves propagating across the array are presented in the time domain instead of the typical slowness domain. This time projection indicates the arrival or beginning time of the different components, for example the three components (302/304/306) of the recorded waveform shown in FIG. 2. It will be understood, however, that FIG. 2 is exemplary in nature and not limited to any particular number of components or any particular kind of data. The time-axis projection technique described herein may be used to detect any number of different components from any kind of data. A time end (308/310/312) of the components (302/304/306) may be found by detecting a local minimum between different relative maximums corresponding to different components. The time end (308/310/312) for one of the components (302/304/306) is therefore obtained as follows:

$$t_{\max} = \min_t T_i(t) \quad (3)$$

Because finding the minimum of a function is a well-known problem, there are many methods known to those of skill in the art having the benefit of this disclosure to accomplish this. Therefore, by projecting the time-slowness map onto the time axis and finding the time ends (308/310/312) of each component (302/304/306) at each level of the formation, it is possible to define a window in the time domain corresponding to a component of interest.

According to one aspect of the present invention, the component of interest is the casing (104, FIG. 1). Therefore, to detect the casing, the semblance map is projected onto the time axis for the slowness value corresponding to the expected value of the casing (104, FIG. 1). The expected slowness value for the casing (104, FIG. 1) is known or can be readily determined by those of skill in the art having the benefit of this disclosure. Accordingly, a user may set the expected casing slowness. It will be understood that the windowing process described herein is not limited to casing detection, but may also be used to apply a window to any signal of interest (compressional, shear, or other signals). However, according to some aspects of the present invention, the windowing process is applied to the casing signal.

After detecting the time position of the casing (or other component of interest), according to one aspect of the present invention it may be filtered from the acoustic data. However, there is a possibility that the window defined above may have other signals embedded with that of the casing. Therefore, before filtering the casing arrival signal (or any other signal of interest), it may be desirable to determine how many other components are present in the window zone.

Accordingly, in order to determine the number of other signals (indicative of other components) within a window, one or more eigenvalues and eigenvectors may be defined. According to one aspect of the invention, observations vectors are defined as y, with the data recorded by the tool (100, FIG. 1) at a level z. This definition assumes the observations vectors to be independent, with a zero mean, and Gaussian random vectors having a covariance matrix equal to a correlation matrix. These observations vectors may include white noise and an independent signal component having a covariance matrix of rank Ns, where Ns is the number of signals present in the receiver (R, FIG. 1) outputs. The joint distribution of the L complex-valued (working in frequency domain) observations vectors y1, . . . , yL is:

$$p(y1, \ldots, yL | \xi) = \prod_{i=1}^{L} \frac{1}{det[\pi K(\xi)]} \exp[-y_i' K^{-1}(\xi) y_i] \quad (4)$$

where K represents the estimate of the covariance matrix and $\xi$ represents the various parameters of the model (eigenvalues, eigenvectors and the variance). The number of sources (signal components) present in the data is computed using the minimum description length (MDL) Criterion that is defined as follows:

$$MDL(N_s) = -\ln p(y_1 \ldots y_L | \hat{\xi}_{ML}) + \frac{1}{2} N_S(2M - N_s + 1)\ln L \quad (5)$$

The value of Ns minimizing the criterion becomes the estimate of the number of signals present in the spatially white noise field. Because of the noise, the maximum number of sources that can be estimated with this technique is M−1, the number of sources minus one. When coherent signals are present, this maximum number may be smaller.

Because the number of sources is known, it is possible to estimate the variance of the noise as:

$$\sigma^2 = \frac{1}{M-1} \sum_{i=N_s+1}^{M} \lambda_i \quad (6)$$

In theory, if there is only one signal in the window all of the eigenvalues will be null except for the one related to the considered signal. In practice, however, this is not normally the case and knowing the number of sources will give an indication of the number of components present in the sonic data.

After estimating the number of sources present in a window, the number of eigenvalues related to the signal of interest is easily computed. When the signal of interest is the casing signal, the number of sources provides the maximum number of eigenvalues that should be related to the casing signal only, because the windowing was limited to the expected arrival of the casing. Therefore, the next step according to some aspects of the invention is to define the number of eigenvalues necessary to rebuild the casing arrival signal (or other signal of interest). Because of the windowing, the main signal in the windowed zone is considered to be that of the casing, so the main eigenvalues $\lambda_1$ will be related to the main signal of the casing. The criterion show below is a way to evaluate how the energy of the eigenvectors, $\phi_i$, vary with the main one (i.e. related to $\lambda_1$).

$$|\phi_{\lambda_1} - \phi_{\lambda_i}| < \epsilon, i=2, \ldots N_s \quad (7)$$

When the variation is higher than 10%, the eigenvector is presumed to be related to the noise and will not be used later to rebuild the signal of interest. In addition, because a source indication has previously been calculated, the number of tests performed thereafter is quite small, inducing a fast selection of the number of the eigenvalues/eigenvectors needed for the reconstruction. At the end of this process, the number of eigenvalues/eigenvector related to the casing arrival is known. Therefore, the casing signal may be rebuilt and removed from the raw sonic data. After selecting the number of eigenvalues related to the casing arrival y, the casing signal $\tilde{y}$ may be reconstructed as:

$$\tilde{y} = \sum_{i=1}^{N_y} C_i \phi_i, \quad (8)$$

with $C_i$ defined as follows:

$$C_i = y^T \phi_i, \quad (9)$$

$\phi_i$ representing the eigenvectors obtained from the computation of the covariance matrix. When the casing signal is reconstructed, it may be subtracted from the raw data. It will be appreciated that any signal from any data source may be detected, reconstructed, and removed from a data set according to the methods above and that the casing signal is merely exemplary.

According to some aspects of the invention, following the filtering of the reconstructed casing signal (or other signal) from the raw data, a second semblance processing technique may be performed to evaluate the compressional and/or the shear slowness of the formation behind casing (104, FIG. 1). During this second semblance process, a filter band used for the processing is selected automatically to remove all the other possible remaining casing modes from the sonic data. The filter band may be selected using two different kinds of information discussed below.

According to one aspect of the invention, casing modes may be modeled as a function of the casing size, fluid slowness and formation slowness. The modeling provides an estimate of the frequency of the casing signal modes for different possible configurations. However, the different casing signal modes will be excited depending of the source signal emitted by the transmitter in the formation, i.e., if the source signal does not excite a specific mode, there is no need to filter it. Therefore, selecting an appropriate filter band may include consideration of the source signature information. The principle of the source signal and mode modeling and consideration is finding a filter band minimizing the energy of the modes of the component of interest that will be found in the acoustic data while maintaining at the same time enough energy to ensure that the signals desired (in a cased borehole, the formation signal) is obtained from the data.

Therefore, in order to select a proper filter band, analysis of sonic or acoustic signals may be required. A sonic signal recorded at one sensor may be expressed as:

$$R(t)=S(t)*[F(t)+P(t)] \quad (10)$$

where R(t), S(t), F(t) and P(t), respectively, are the recorded signal, the source signal, the formation and the casing excitation function. To simplify the problem it may be assumed that the transfer function of the formation is a delta function. Accordingly, after the transformation in the frequency domain the expression becomes:

$$R(\omega)=S(\omega)*[1+P(\omega)] \quad (11)$$

Figure 3:
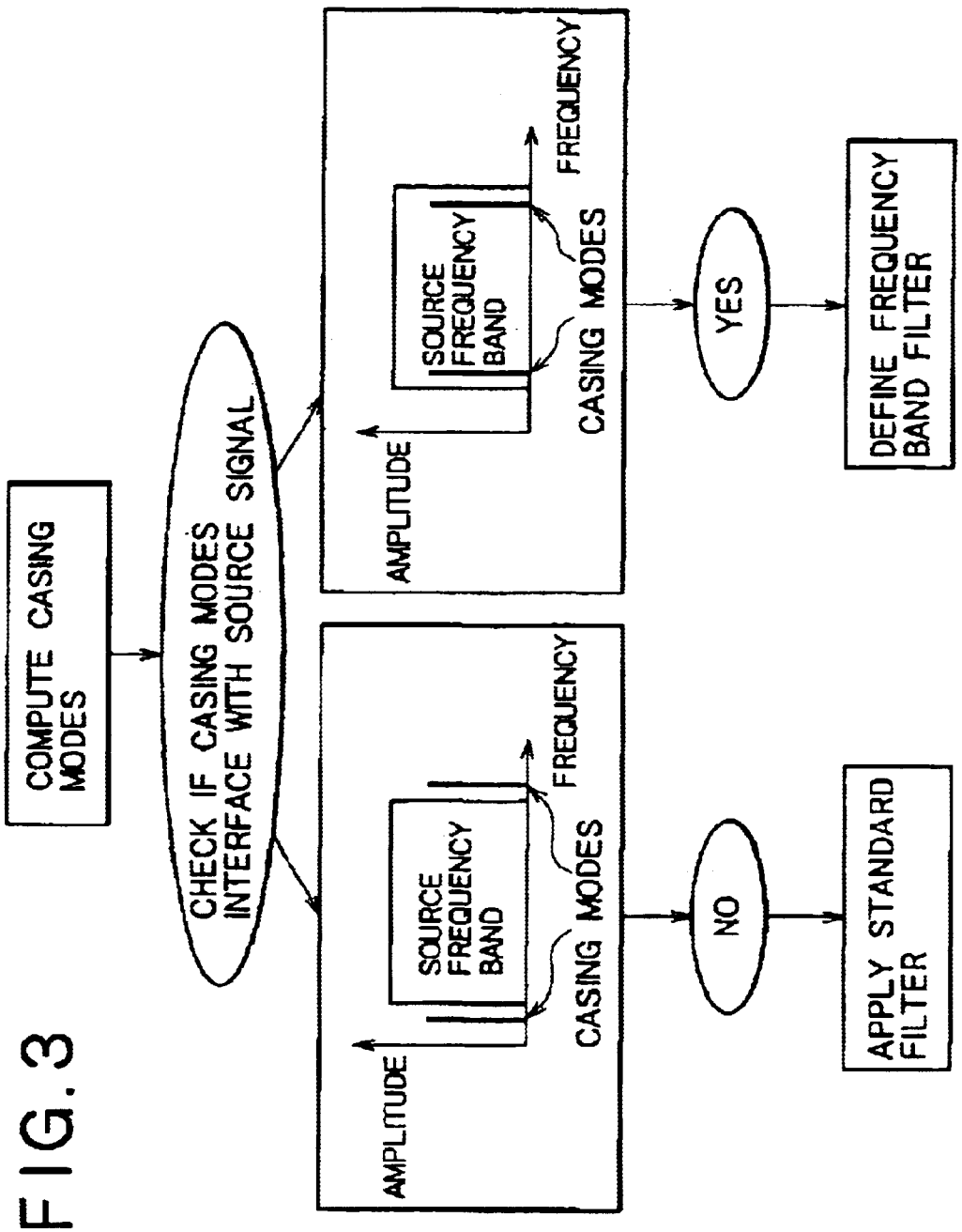
FIG. 3 is a flowchart illustrating principles of an automatic filter band selection according to one aspect of the present invention.
Figure 4:
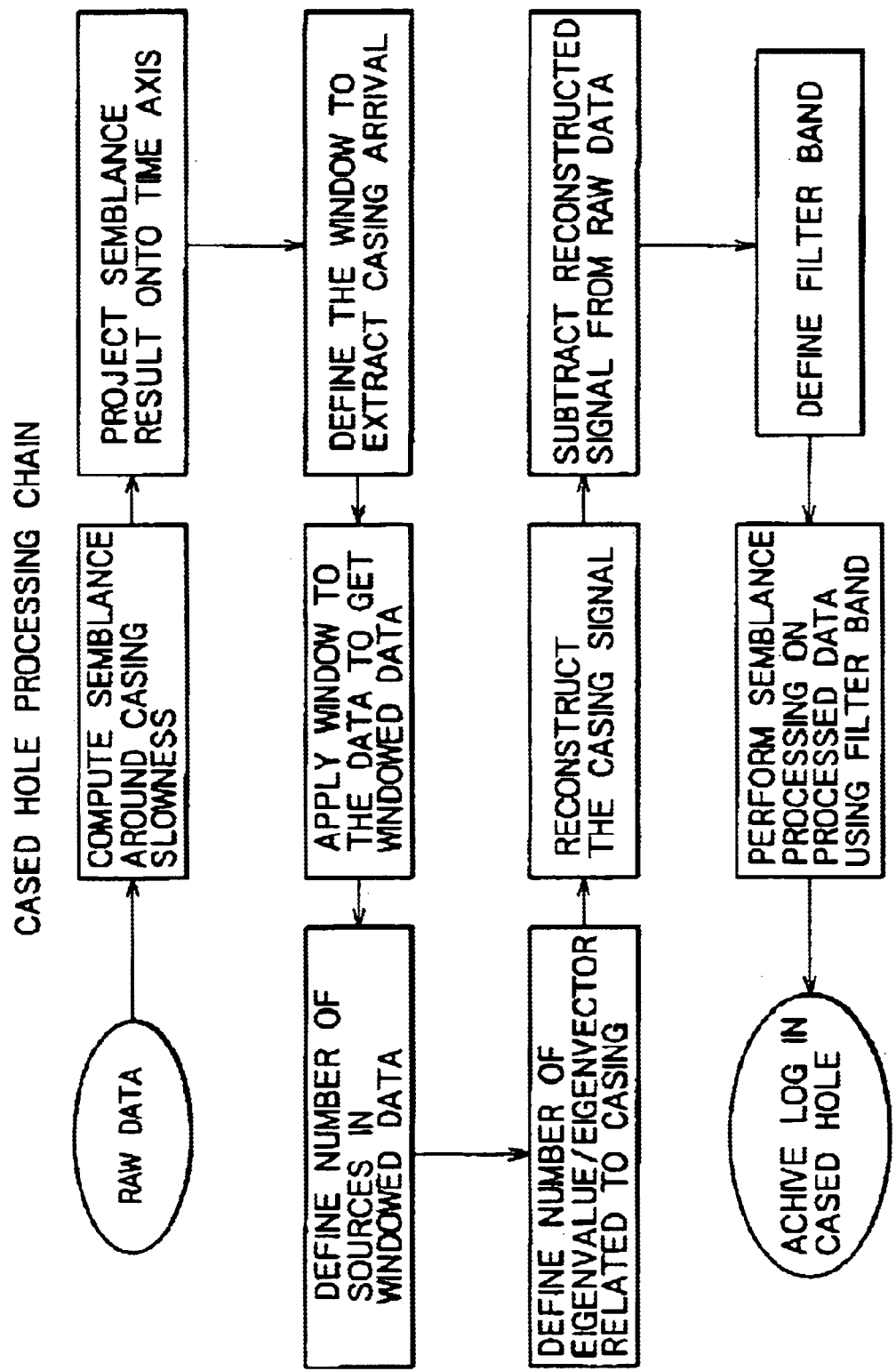
FIG. 4 is a flow chart illustrating a method of processing sonic data according to one aspect of the present invention.
Figure 5:
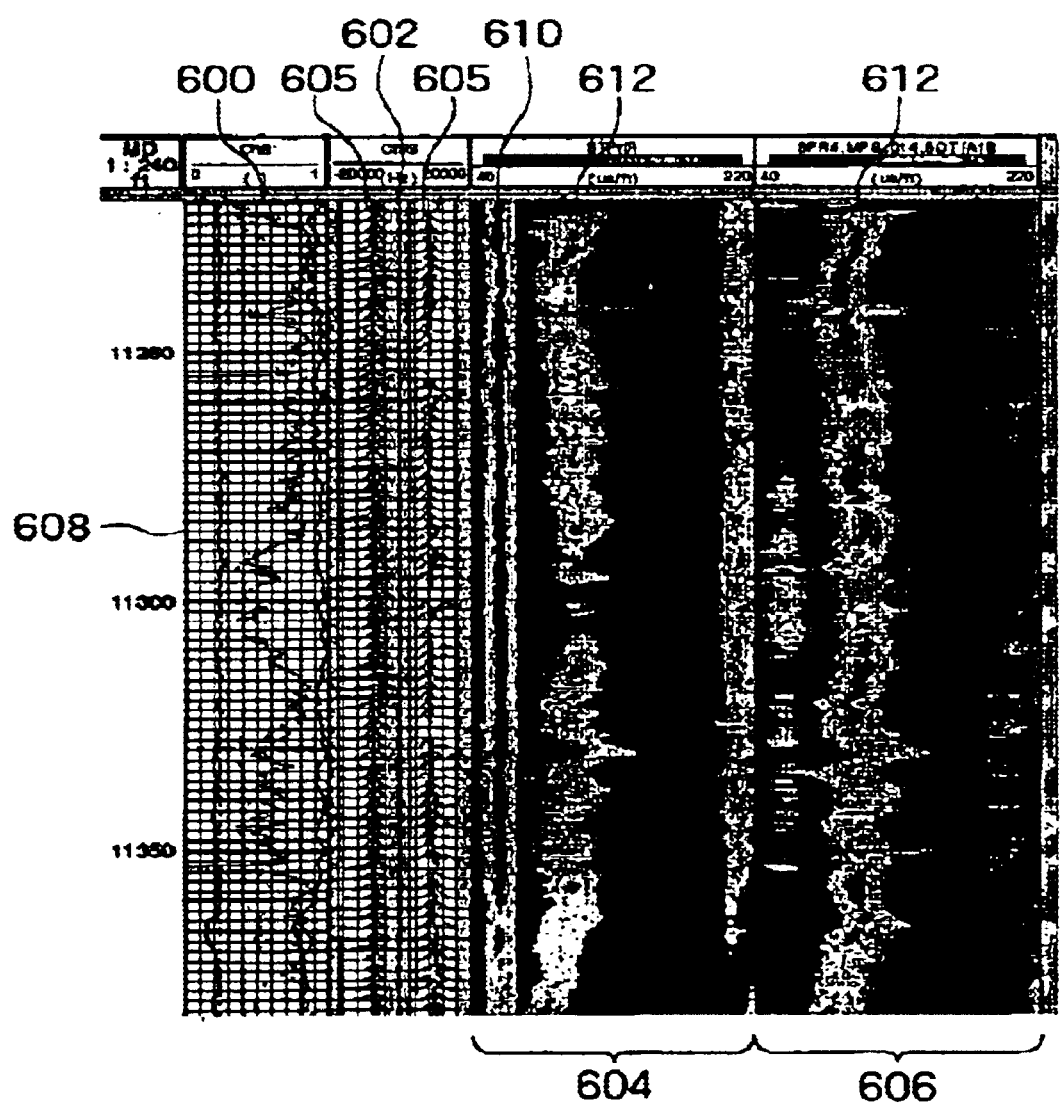
FIG. 5 is an example of sonic data in a cased borehole processed according to principles of the present invention.

As discussed above, according to one aspect of the invention it is desirable to minimize the energy of the casing modes (or other component modes), which may be accomplished by filtering the product $E=S(\omega)P(\omega)$. However, the signals related to the formation itself or other desired signal must be maintained and preferably minimally diminished by a filter band. Therefore, two cases may be considered. The first and simplest situation may be when the casing modes do not interact with the expected frequency band of the formation. In such a situation, a standard frequency band may be used. However, if the casing modes do interfere with the frequency band of the formation, the problem becomes more complex as a compromise between filtering the casing signal in a certain frequency band and keeping the formation signals must be made. One criterion that may be used is based on the casing mode signal energy by computing the quantity $E_{band}$ defined as follows:

$$E_{band} = \frac{\int_{\omega_1}^{\omega_2} |S(\omega)|^2 \, d\omega}{\int_0^{\infty} |S(\omega)|^2 \, d\omega} \quad (12)$$

where $\omega_1$ and $\omega_2$ are the frequency bands selected for filtering, and S is the sonic source signal emitted in the formation by the transmitter (T, FIG. 1). If the casing modes do not interfere with the expected formation signal, the ratio is 1 and a standard filter band is applied. When the casing modes do interfere with the expected formation signals, to minimize the effect of the casing signal and keep enough energy for the processing of the formation data, $\omega_1$ and $\omega_2$ may be chosen such that $E_{band}$ is greater than about 0.3, preferably greater than about 0.5. At an $E_{band}$ ratio of about 0.5, the two objectives of filtering the casing modes while keeping the formation signal are both met. Accordingly, the frequency band of the filter is defined by the values of $\omega_1$ and $\omega_2$. The $\omega_1$ and $\omega_2$ values may be computed for different configurations to build a look-up table according to some aspects of the present invention. A look-up table may be readily build by those of skill in the art having the benefit of this disclosure. In the present situation for a casing, the look-up table may include many or all of the different possible casing scenarios (different combinations of formation, mud velocity, and casing size, etc.) in order to avoid the computation of the $\omega$ criterion during logging, and to minimize the number of user inputs required for a logging operation. Other look-up tables for other signals of interest may likewise be build depending on the application. FIG. 3 illustrates by flow chart the principle of the automatic filter band selection method described above. In addition, FIG. 4 illustrates by flow chart the steps of one method for calculating formation slowness through a cased borehole and/or removing the casing signals from sonic data. It will be appreciated, however, that the flow charts of FIGS. 3 and 4 are exemplary in nature and that according to some aspects of the invention fewer and/or addition steps may be used and that the invention is not limited to the illustrations of FIGS. 3 and 4. As stated previously, the method is not limited to sonic data, nor is it limited to filtering of casing signals. Any signals from any data set may be filtered according the methods of the present invention. It is intended that the scope of the invention be defined by the appended claims.

EXAMPLES

Figure 6:
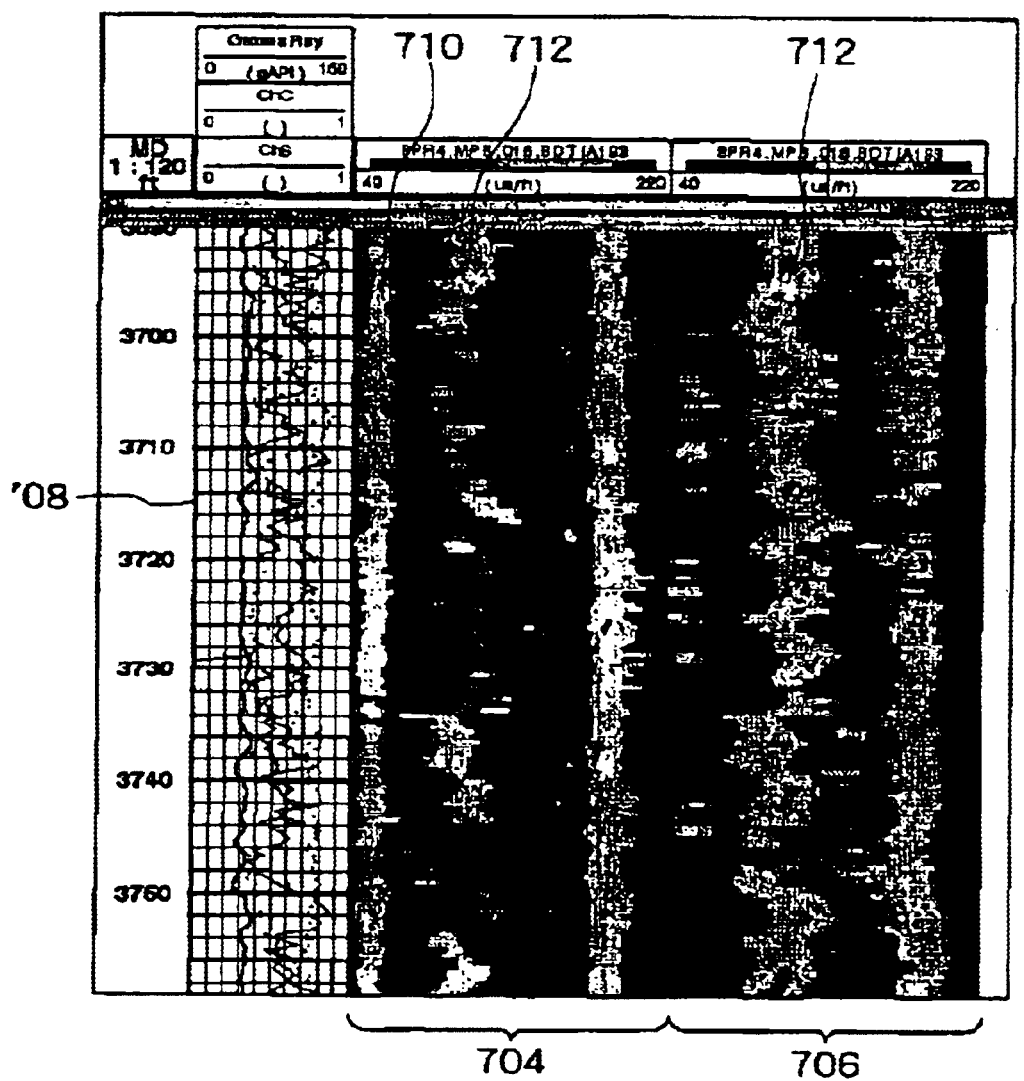
FIG. 6 is another example of sonic data in a cased borehole processed according to principles of the present invention.

The methods described above have been implemented on actual acoustic data, some of the results of which are presented below. One example of the methods described above was applied on real data recorded with a Dipole Sonic Imager in a cased borehole. Referring to FIG. 6, a first track (600) represents a coherence dot curve. A second track (602) is also shown adjacent to the first track (600). The first and second tracks (600 and 602) in combination represent the spectrum of the coherence peaks (605), respectively, for the shear and compressional arrival signals when present in a log (608). A third track (604) represents the slowness projection before the casing signal has been removed from the data, and a fourth track (606) is the result of the slowness projection following removal of the casing signal as explained above.

As shown in FIG. 6, there is a strong and coherent arrival (610) on the log (608) when the compressional signal of the formation is not continuous and present with only low coherence. After processing the sonic data according the methods of the present invention, however, the casing arrival signals (610) have been successfully removed. Further, the coherence of the compressional arrival signals (612) has increased significantly, making the interpretation of the log (608) much simpler than prior processing techniques allow.

Referring next to FIG. 7, another example of applying the methods for determining formation slowness behind a casing as described above is shown. As with FIG. 6, a log (708) illustrates monopole P-wave and S-wave (compressional and shear waves) data recorded through a casing. It will be appreciated from a second track (704) of this example that a casing arrival signal (710) and a compressional arrival (712), having a low coherence and a discontinuous log (708), renders evaluation of the compressional slowness (712) through the casing impossible. However, after processing the sonic data according to methods described above, the casing arrival signal (710) disappears while at the same time the coherence and the continuity of the compressional slowness (712) on a third track (706) is significantly improved and useful. Similar results may be accomplished for other data types and other components of interest.

The description and figures above present a methodology and apparatus for automatically processing acoustic waveforms. The processing method may include automatically zoning the component signal of interest (in the examples above, a casing arrival signal), computing a semblance, but projecting the acoustic waveform data into the time domain. This projection yields an estimate of the component signal arrival in the time domain together with its time end. In addition, the component signal arrival may be filtered using automatic eigenvalues analysis and selection. The eigenvalues/eigenvectors related to the component arrival are automatically selected, allowing the reconstruction of the component signal. Following reconstruction of the component signal, it is simple to remove it from the data. When the component signal is removed from the data, a second semblance processing may be applied using an automatic filter band defined using modeling and the information on the source signature. The final result of this processing is clearer evaluation of the data (in the examples above the compressional slowness and shear (when possible) of the formation automatically behind casing).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of isolating and/or removing a signal of interest comprising:
generating acoustic waves with a tool having at least one transmitter and at least one receiver;
automatically filtering the signal of interest from acoustic waveform data received by the at least one receiver, by computing a first semblance including the signal of interest and projecting the first semblance into a time domain; and
semblance processing the automatically filtered acoustic waveform data.

2. The method of claim 1, wherein the time ends of the semblance are obtained using local minimums.

3. The method of claim 1, wherein projecting the acoustic waveform data into a time domain comprises indicating an arrival time of different components of a recorded waveform.

4. The method of claim 3, further comprising evaluating a time end of a component by detecting a local minimum between different relative maximums corresponding to different components.

5. The method of claim 1, wherein automatically filtering further comprises defining a window containing the signal of interest.

6. The method of claim 5, wherein defining a window further comprises defining an optimal filtering frequency band to remove other modes of the signal of interest.

7. The method of claim 6, further comprising applying the window to the acoustic waveform data and defining a number of signals in the window.

8. The method of claim 6, further comprising defining a number of eigenvalues and eigenvectors related to the signal of interest and rebuilding the signal of interest.

9. The method of claim 8, further comprising subtracting a rebuilt signal of interest from the acoustic waveform data.

10. The method of claim 1, wherein the acoustic waveform data is sonic data.

11. The method of claim 1, wherein the signal of interest is a casing signal in a borehole.

12. The method of claim 1, wherein the signal of interest is a compressional signal for a formation traversed by a borehole.

13. A method of removing one or more signals of interest from acoustic data comprising:
 projecting the acoustic data onto a time axis;
 detecting a time position of the one or more signals of interest; and
 filtering the one or more signals of interest from the acoustic data.

14. The method of claim 13, wherein filtering further comprises windowing the one or more signals of interest.

15. The method of claim 14, further comprising automatically determining how many components are present in a window using statistical criterion.

16. The method of claim 15, further comprising defining a number of eigenvalues related to the components.

17. The method of claim 16, further comprising rebuilding the one or more signals of interest.

18. The method of claim 17, further comprising removing the one or more signals of interest from the acoustic data.

19. The method of claim 18, further comprising performing semblance processing of the acoustic data with the one or more signals of interest removed to evaluate the compressional and shear slowness of a formation behind a casing.

20. The method of claim 13, wherein said one or more signals of interest comprise arrival signals for a casing.

21. The method of claim 20, wherein the projecting the acoustic data onto a time axis further comprises projecting for a slowness value corresponding to a known slowness value of the casing.

22. The method of claim 13, wherein the acoustic data further comprises a semblance map.

23. A method of determining formation slowness in a cased borehole comprising:
 receiving acoustic waveform data from a transmitter;
 computing a first semblance based on the acoustic waveform data projected into a time domain; and
 filtering a signal of interest from the acoustic waveform data using automatic eigenvalues analysis and selection.

24. The method of claim 23, wherein the signal of interest is a casing arrival signal.

25. The method of claim 23, further comprising computing a second semblance on filtered data to obtain compressional and shear slowness of a formation through a casing.

26. The method of claim 23, wherein computing the first semblance further comprises defining at each level an arrival time of the signal.

27. The method of claim 23, wherein filtering further comprises defining a window to extract the signal of interest based on a result of the first semblance computation projected into the time domain.

28. The method of claim 27, wherein filtering further comprises applying the window to the acoustic waveform data.

29. The method of claim 27, wherein filtering further comprises defining a number of signals present in the window.

30. The method of claim 29, wherein filtering further comprises defining a number of eigenvalues and eigenvectors related to the signals present in the window.

31. The method of claim 30, wherein the eigenvectors are obtained by computation of a covariance matrix.

32. The method of claim 31, wherein the filtering further comprises rebuilding the signal of interest.

33. The method of claim 32, wherein the filtering further comprises subtracting a rebuilt signal of interest from the acoustic waveform data.

34. The method of claim 33, wherein filtering further comprises defining a filter band to automatically remove all other possible modes of the signal of interest from the acoustic waveform data.

35. The method of claim 34, wherein the defining a filter band further comprises:
 comparing possible signal of interest modes to a signal spectrum from the transmitter; and:
  if there is no interference between the signal of interest modes and the signal spectrum from the transmitter, than applying a standard frequency filter;
  if there is interference between the signal of interest modes and the signal spectrum from the transmitter, then defining and applying a filter band to automatically remove all other possible remaining signal of interest modes from the acoustic waveform data.

36. The method of claim 34, wherein defining a filter band further comprises defining two frequency bands such that an $E_{band}$ value is greater than or equal to about 30%.

37. The method of claim 36, wherein the $E_{band}$ value is greater than or equal to about 50%.

38. A method of determining formation slowness in a cased borehole comprising:
 generating acoustic waves with a transmitter;
 receiving the acoustic waves using at least one receiver and generating acoustic raw data;
 computing semblance of an arrival of interest in the slowness-time domain;
 projecting semblance map onto a time axis;
 defining a window size to extract the arrival of interest signal;
 applying the window to the raw data to define a windowed data set;
 defining a number of sources in the windowed data using a statistical method;

defining a number of eigenvalues and eigenvectors related to the arrival of interest signal;

rebuilding the arrival of interest signal;

subtracting the rebuilt arrival of interest signal from the raw data to create a processed data set;

defining a frequency filter band; and semblance processing the processed data set using the frequency filter band.

39. The method of claim 38, wherein the arrival of interest signal comprises a casing signal.

40. An apparatus for determining formation slowness in a cased wellbore comprising:

at least one acoustic transmitter;

at least one acoustic receiver;

a processor coupled to the acoustic source, the acoustic receiver, or both, and programmed to automatically filter an arrival signal of interest from acoustic data received by the at least one acoustic receiver in part by projecting a first semblance map onto a time axis and apply semblance processing to automatically filtered acoustic data.

41. The apparatus of claim 40, wherein the arrival signal of interest comprises a casing signal.

42. The apparatus of claim 40, wherein the processor is programmed to:

compute a first semblance of the arrival signal of interest in the slowness-time domain;

define a window size to extract the arrival signal of interest;

apply the window to the acoustic data to define a windowed data set;

define a number of sources in the windowed data using a statistical method;

define a number of eigenvalues and eigenvectors related to a component of interest;

rebuild the arrival signal of interest;

subtract the rebuilt arrival signal of interest from the acoustic data to create a processed data set;

define an acoustic signal frequency filter band; and apply semblance processing to the processed data set using the frequency filter band.

43. A method of isolating and/or removing a signal of interest comprising:

generating pressure waves with at least one transmitter, and receiving the pressure waves with at least one receiver;

automatically filtering the signal of interest from the pressure waveform data received by the at least one receiver, by computing a first semblance including the signal of interest and projecting the first semblance into a time domain; and semblance processing the automatically filtered pressure waveform data.

44. The method of claim 43 wherein the pressure waves include sonic waves, the pressure waveform data include sonic waveform data, and the filtered pressure waveform data include sonic waveform data.

45. The method of claim 43 wherein the pressure waves include seismic waves, the pressure waveform data include seismic waveform data, and the filtered pressure waveform data include seismic waveform data.

46. The method of claim 43 wherein the pressure waves include ultrasonic waves, the pressure waveform data include ultrasonic waveform data, and the filtered pressure waveform data include ultrasonic waveform data.

47. The method of claim 43, wherein the time ends of the semblance are obtained using local minimums.

48. The method of claim 43, wherein projecting the pressure waveform data into a time domain comprises indicating an arrival time of different components of a recorded waveform.

49. The method of claim 43, wherein automatically filtering further comprises defining a window containing the signal of interest.

50. The method of claim 49, wherein defining a window further comprises defining an optimal filtering frequency band to remove other modes of the signal of interest.

51. The method of claim 50, further comprising applying the window to the pressure waveform data and defining a number of signals in the window.

52. The method of claim 50, further comprising defining a number of eigenvalues and eigenvectors related to the signal of interest and rebuilding the signal of interest.

53. The method of claim 52, further comprising subtracting a rebuilt signal of interest from the pressure waveform data.

* * * * *